United States Patent [19]
Cohen et al.

[11] Patent Number: 5,781,457
[45] Date of Patent: Jul. 14, 1998

[54] MERGE/MASK, ROTATE/SHIFT, AND BOOLEAN OPERATIONS FROM TWO INSTRUCTION SETS EXECUTED IN A VECTORED MUX ON A DUAL-ALU

[75] Inventors: Earl T. Cohen, Fremont; James S. Blomgren, San Jose; David E. Richter, Milpitas, all of Calif.

[73] Assignee: Exponential Technology, Inc., San Jose, Calif.

[21] Appl. No.: 649,116

[22] Filed: May 14, 1996

Related U.S. Application Data

[63] Continuation-in-part of Ser. No. 609,908, Feb. 29, 1996, which is a continuation-in-part of Ser. No. 444,814, May 18, 1995, Pat. No. 5,497,341, which is a continuation of Ser. No. 207,751, Mar. 8, 1994, Pat. No. 4,442,577.

[51] Int. Cl.[6] ........................................ G06F 7/38
[52] U.S. Cl. ........................................ 364/716.02
[58] Field of Search .............. 364/716.02, 716.01, 364/736.01

[56] References Cited

U.S. PATENT DOCUMENTS

| | | | |
|---|---|---|---|
| 3,764,988 | 10/1973 | Onishi | 340/172.5 |
| 4,460,970 | 7/1984 | McClary | 364/761 |
| 4,608,660 | 8/1986 | Hasbe | 364/768 |
| 4,748,582 | 5/1988 | New et al. | 364/754 |
| 4,761,756 | 8/1988 | Lee et al. | 364/757 |
| 4,831,573 | 5/1989 | Norman | 364/716 |
| 4,860,235 | 8/1989 | Kondou et al. | 364/716 |
| 4,992,934 | 2/1991 | Portanova et al. | 364/200 |
| 5,195,051 | 3/1993 | Palaniswami | 364/748 |
| 5,227,989 | 7/1993 | Jones, Jr. et al. | 364/716 |
| 5,251,167 | 10/1993 | Simmonds et al. | 364/760 |
| 5,327,364 | 7/1994 | Jones, Jr. et al. | 364/716 |
| 5,333,120 | 7/1994 | Gilbert | 364/786 |
| 5,442,576 | 8/1995 | Gergen et al. | 364/715.08 |
| 5,633,808 | 5/1997 | Morishima | 364/716.02 |

*Primary Examiner*—Tan V. Mai
*Attorney, Agent, or Firm*—Stuart T. Auvinen

[57] ABSTRACT

A Boolean logic unit (BLU) features a vectored mux. Boolean instructions are executed by applying operands to the select inputs but truth-table signals to the data inputs. Merge and mask operations are performed by reversing the connection and inputting the operands to the data inputs but applying a merge mask to the select inputs. A byte-spreader copies byte or 16-bit operands to 32-bits before being rotated and merged by the vectored mux. A rotator is used to rotate an operand before being applied to the data input of the vectored mux so that compound rotate-merge operations can be executed in a single step through the vectored mux. A carry flag may also be merged in during a multi-step bit-test instruction. Complex CISC instructions such as rotate-through-carry and shift-double are executed in multiple steps on the vectored mux. Intermediate results are stored in the multiplier-quotient temporary registers which are normally used for multiply and divide instructions. A RISC ALU using the vectored mux BLU is modified only slightly to support execution of CISC instructions. Merge, mask, rotate, shift, and Boolean operations of both RISC and CISC instruction sets are executed in the same ALU because of the inherent flexibility of the vectored mux architecture.

16 Claims, 12 Drawing Sheets

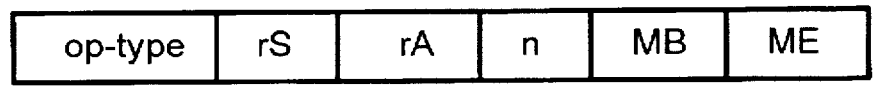
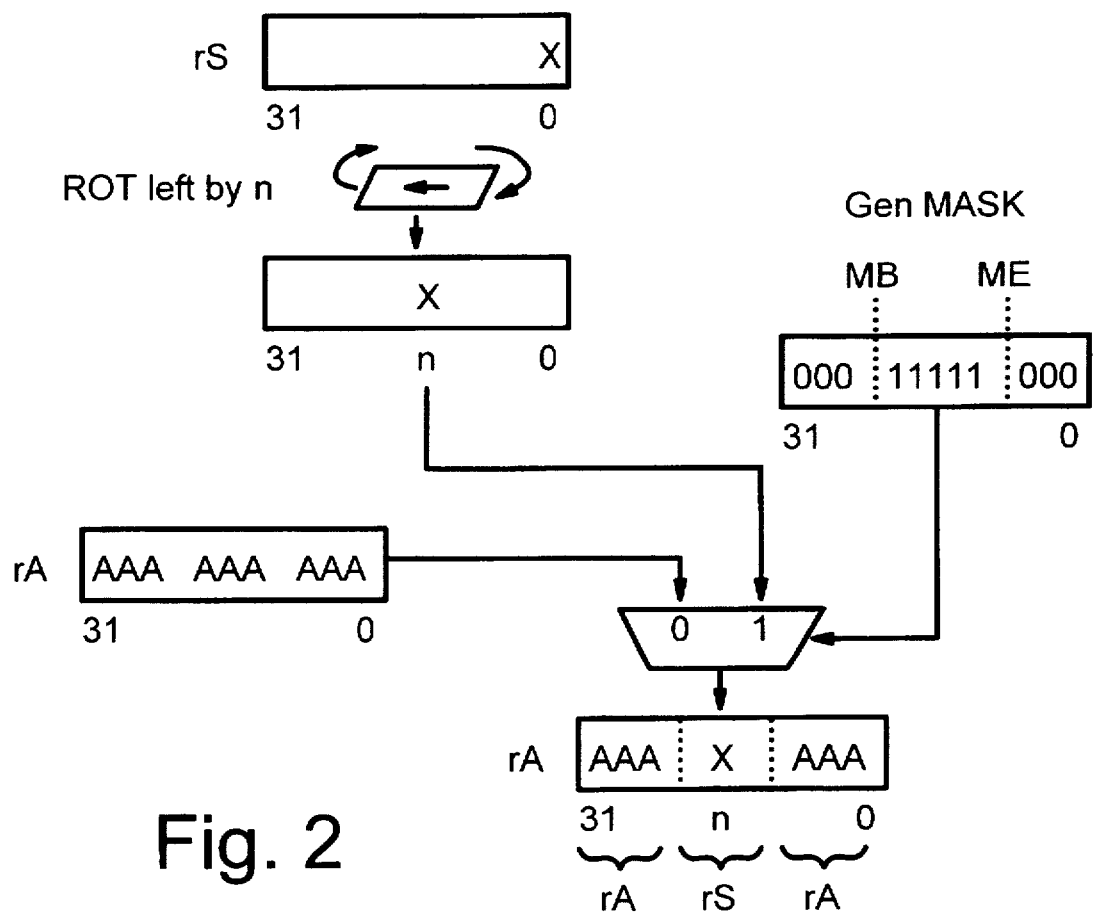
Fig. 2

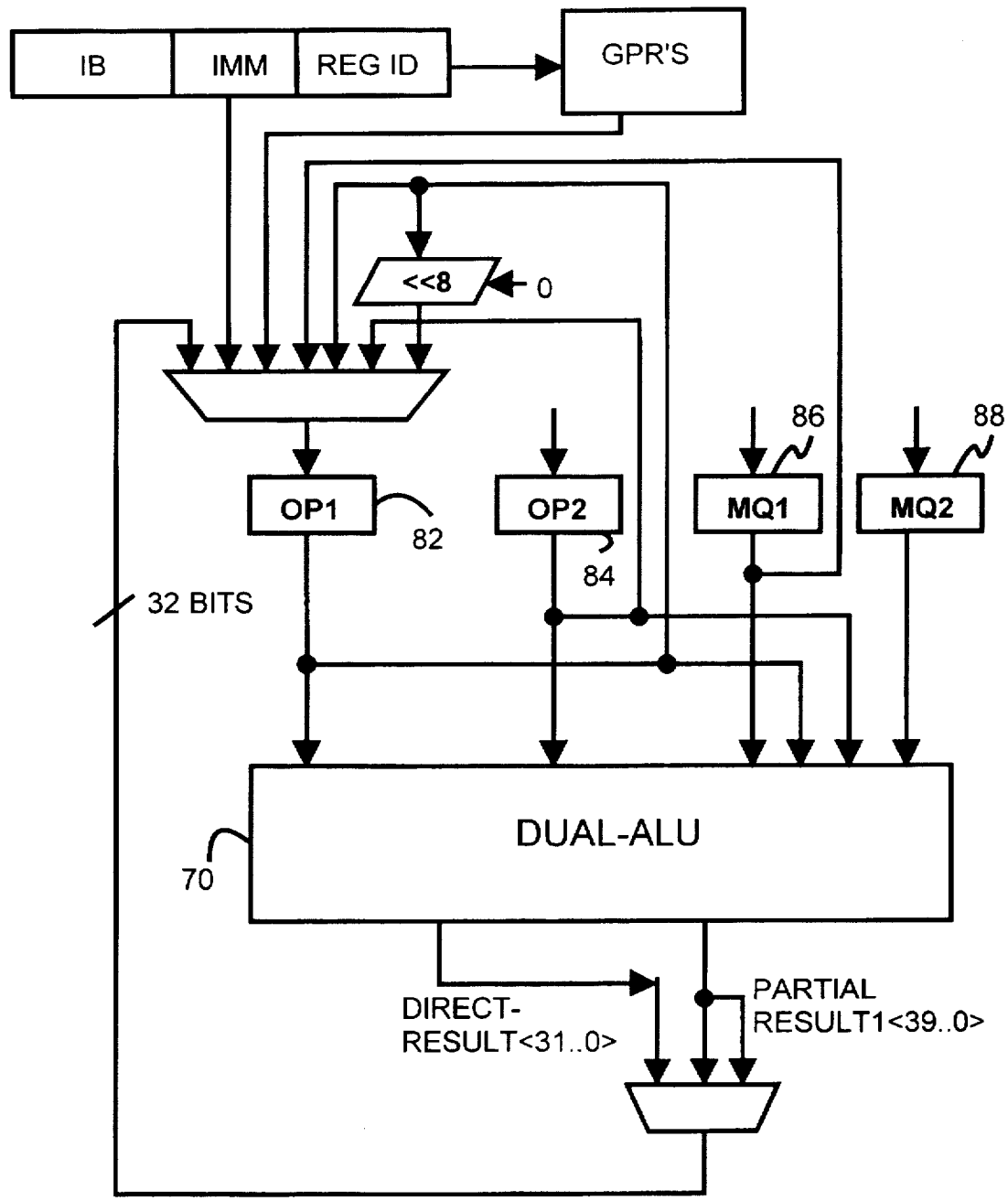
OP1 LOADING    Fig. 10

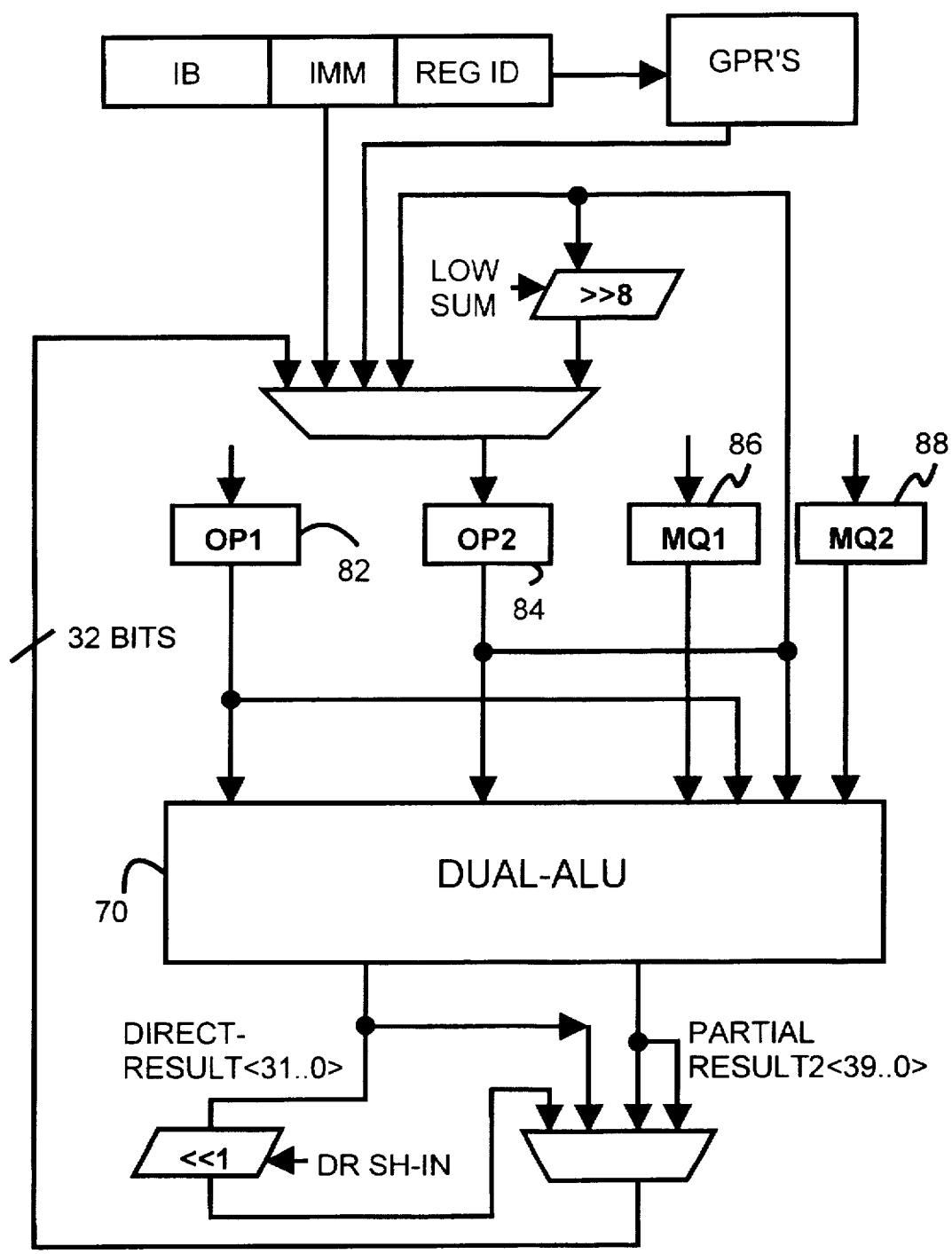
OP2 LOADING Fig. 11

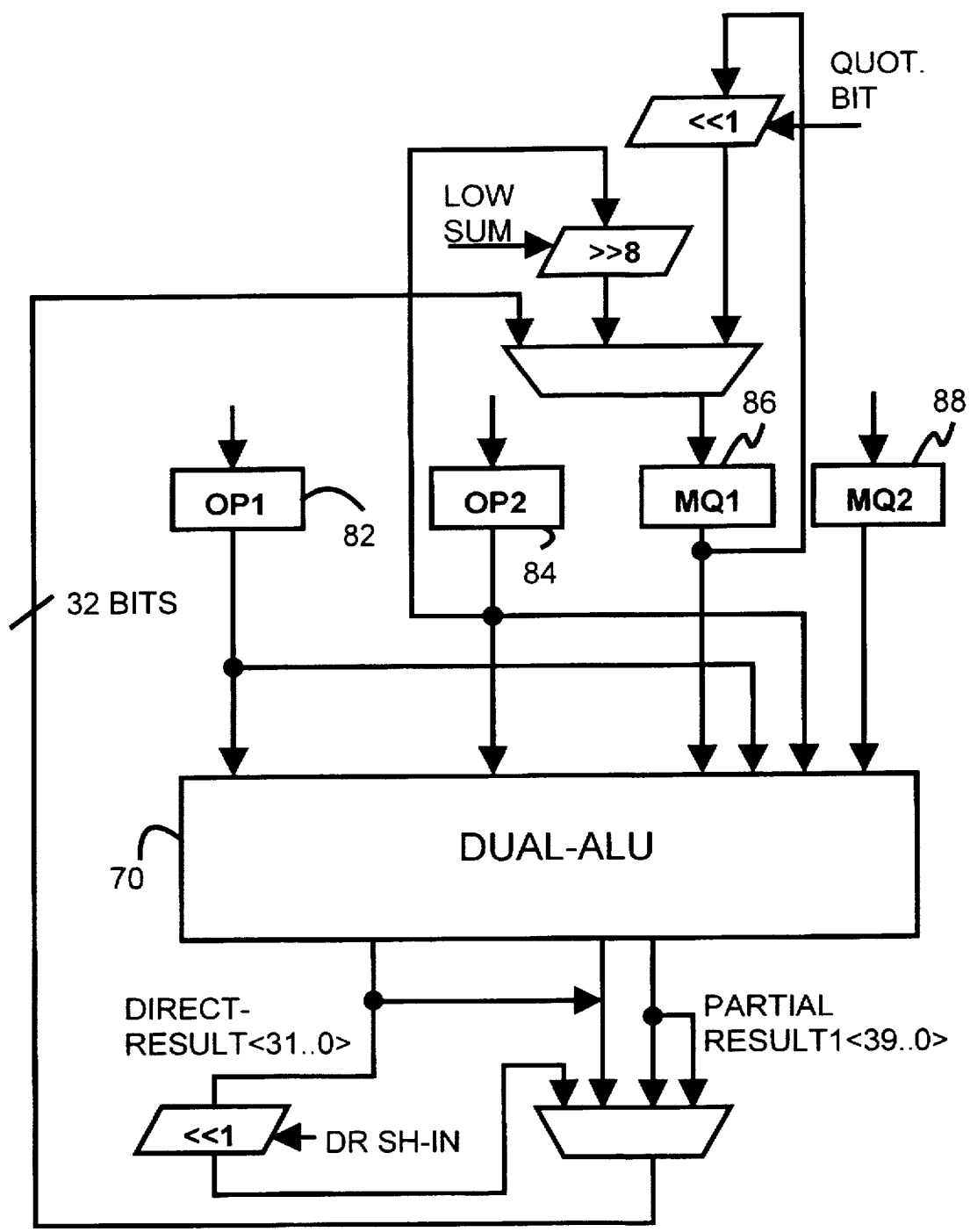
MQ1 LOADING    Fig. 12

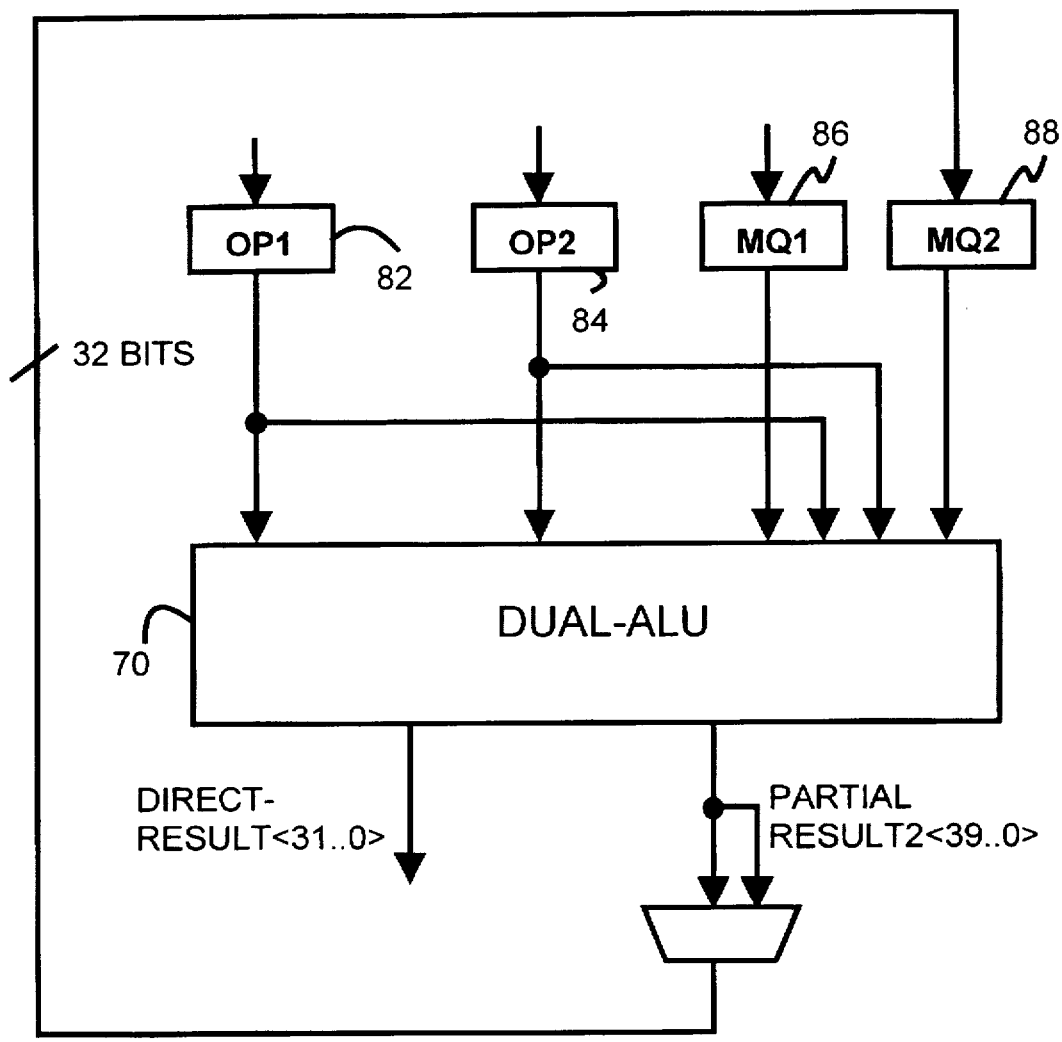
MQ2 LOADING  Fig. 13

MERGE/MASK, ROTATE/SHIFT, AND BOOLEAN OPERATIONS FROM TWO INSTRUCTION SETS EXECUTED IN A VECTORED MUX ON A DUAL-ALU

RELATED APPLICATIONS

This application is a continuation-in-part (CIP) of U.S. Ser. No. 08/609,908 filed Feb.29, 1996 Pending, which is a continuation-in-part (CIP) of U.S. Ser. No. 08/444,814, filed May 18, 1995 now U.S. Pat. No. 5,497,341, which is a continuation of U.S. Ser. No. 08/207,752 filed Mar. 8, 1994, now U.S. Pat. No. 5,442,577, hereby incorporated by reference.

FIELD OF THE INVENTION

This invention relates to digital arithmetic units, and more particularly to methods for sign-extension, masking, merging, and bit-test operations.

DESCRIPTION OF THE RELATED ART

The grand-parent, U.S. Pat. No. 5,442,577, disclosed a vectored mux for performing Boolean operations and sign-extension of an operand or immediate constant. The vectored mux performs both the Boolean operation and the sign-extension simultaneously as one atomic operation.

Both a Boolean operation, such as AND, XOR, AND-OR, and a sign-extension of one operand can be performed as an atomic operation using the vectored mux. The vectored mux is a bank of 32 ordinary four-to-one muxes (for 32-bit operands). Each individual mux generates one bit of the output. The two operands are routed to the two select or control inputs of the vectored mux rather than to the four data inputs. The two select inputs determine which one of the four data inputs is connected to the output.

The four data inputs of the vectored mux are not connected to the operands. Instead, signals representing a truth table for the Boolean operation are applied to these data inputs. The logical values of each bit on the two operands selects the proper entry of the truth table, which is output for that bit-position. Of course, these signals are electrical voltages which represent logical values such as ones and zeros as is well-known in the art.

This unusual connection of the operands to the select inputs of the vectored mux allows many kinds of Boolean operations to be performed on the input operands. For a simple AND operation, the output is high when both input operands are high for a particular bit-position. Thus truth-table signals of 0001 are applied to data inputs D0, D1, D2, D3 respectively for each 4:1 mux. When a particular bit-position has both operands high, then the "1" input to data input D3 is selected as the output for that bit-position.

Another advantage of the vectored mux is that different operations can be applied to different bit-positions for the 32-bit result. An AND operation can be applied to the lowest 8 bits, while a sign-extend operation is applied to the upper 24 bits. The sign-extend operation applied to the upper 24-bits can be a sign-extend of an 8-bit first operand combined with an AND-operation with the second operand.

Simply by changing the truth-table applied to the data inputs, any arbitrary logical function can be performed by the vectored mux. By varying the truth-table inputs for different bit-positions in the vectored mux, different operations can be performed on different parts of an input operand. Thus the vectored mux is versatile yet simple in construction.

A processor can use the vectored mux as a Boolean Logic Unit (BLU) in an arithmetic-logic-unit (ALU) or an integer execute unit. Arithmetic operations such as ADD's and increments are executed in an adder in the ALU while multiply and divide operations can be performed in an integer multiplier also in the ALU. Boolean operations such as AND's, OR's, and complements can be performed by the vectored mux. Sign-extensions can also be performed by the vectored mux along with a Boolean operation as a single-step atomic operation.

The parent application, U.S. Ser. No. 08/609,908, disclosed extensions to the to vectored mux to allow execution of a variety of other operations, such as merges, shifts, and rotates in addition to Boolean operations. Rotate or shift operations are often combined with merge operations for rotate-merge instructions. These rotate, shift, mask, and merge operations must also be executed by the ALU. The parent application described several RISC instructions from the PowerPC™ RISC instruction set.

It is greatly desired to execute both RISC and x86 CISC instructions on the same central processing unit (CPU). This could allow a RISC computer to execute newer PowerPC™ RISC programs and also execute older x86 CISC programs. A vast amount of code has been written with native x86 instructions which currently can only be emulated in software on RISC computers. Software emulation is slow and thus little or no performance gain is observed when running the CISC programs on emulators on RISC computers.

What is desired is to extend the vectored mux to perform mask and merge operations for instructions from two different instruction sets. It is desired to use the vectored mux to perform Boolean, merge/mask, and shift/rotate operations from both a RISC and a CISC instruction set. It is also desired to perform more complex CISC operations such as rotate-through-carry, bit-test-and-complement, and shift-double using the vectored mux. It is desired to use a RISC execution unit which includes a vectored mux to execute both RISC instructions and CISC instructions. It is desired to extend a RISC ALU to allow native execution of CISC instructions.

SUMMARY OF THE INVENTION

A logic-instruction execution unit executes Boolean operations and merge operations. The logic-instruction execution unit has a vectored mux which outputs a result of a Boolean operation or a merge operation. The vectored mux has a plurality of individual mux cells, and each mux cell has data inputs and select control inputs and an output driving one bit-position of the result. The select control inputs control which data input is coupled to drive the output independently of other data inputs.

A first operand input has a plurality of electrical signals representing a first operand, while a second operand input has a plurality of electrical signals representing a second operand. Operand-spread means receives the first operand input. It extends the first operand from a reduced-width operand to a full-width operand by duplicating the reduced-width operand to fill bit-positions in a full-width operand beyond the reduced-width operand. The operand-spread means outputs a spread first operand to a first data input of the vectored mux when the first operand is a reduced-width operand.

Boolean control means applies the first operand input and the second operand input to the select control inputs of the vectored mux when a Boolean operation is executed. Truth-table inputs are electrical signals that represents a truth table for the Boolean operation. The truth-table inputs vary for different Boolean operations. The Boolean control means includes means for applying the truth-table inputs to the data inputs of the vectored mux when a Boolean operation is executed.

Merge control means applies the spread first operand to the first data input on the vectored mux and applies the second operand input to a second data input on the vectored mux when a merge operation is executed. A mask generator generates a mask indicating a first portion of the result from the first operand and a second portion of the result from the second operand. The first portion and the second portion do not overlap.

The merge control means includes a means for applying the mask to a select control input of the vectored mux when a merge operation is executed. The mask causes the vectored mux to select the first portion of the first operand applied to the first data input and the second portion of the second operand applied to the second data input.

Thus the vectored mux executes both merge operations and Boolean operations. The operands are applied to the data inputs for merge operations but are applied to the select control inputs for Boolean operations.

In further aspects the reduced-width operand is a byte operand. The operand-spread means is disabled for RISC instructions but enabled for CISC instructions which use reduced-width operands.

In other aspects the vectored mux is comprised of individual four-to-one mux cells each having four data inputs and two select control inputs. The merge control means further has a constant means for applying a constant electrical signal to one of the select control inputs when a mask or a merge operation is executed. The constant electrical signal prevents two of the four data inputs from being selected while allowing only the first and the second data inputs to be selected for mask and merge operations. Thus the vectored mux uses four data inputs for Boolean operations of two operands but only two data inputs for mask and merge operations.

In still further aspects of the invention a rotate means receives the spread first operand. It rotates the spread first operand by a shift-count number of bit-positions and outputs a rotated first operand to the first data input of the vectored mux when a rotate operation is executed. The merge control means applies the mask having a constant value when a simple rotate operation is executed. The constant value causes the rotated first operand to be selected to drive the output of the vectored mux as the result. Thus rotate operations are also performed by the logic-instruction execution unit and rotate results are passed through the vectored mux.

BRIEF DESCRIPTION OF THE DRAWINGS

FIG. 2 illustrates the operation performed by a RISC rotate-merge instruction.

FIG. 10 highlights loading of input register OP1.

FIG. 11 highlights loading of input register OP2.

FIG. 12 highlights loading of temporary register MQ1.

FIG. 13 highlights loading of temporary register MQ2.

DETAILED DESCRIPTION

The present invention relates to an improvement in digital operations. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

DESCRIPTION OF BASIC VECTORED MUX—FIG. 1

Figure 1:
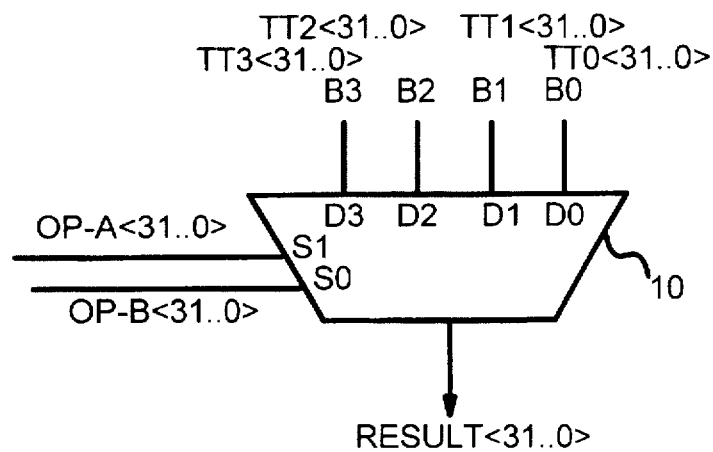
FIG. 1 is a diagram of a vectored mux for performing Boolean logic functions.

FIG. 1 is a diagram of a vectored mux for performing Boolean logic functions. Vectored mux 10 has 32 individual 4:1 muxes, one generating each bit-position in the 32-bit result. The two input operands, OP-A, OP-B, are applied to the control or select inputs S1, S0 of vectored mux 10. Each of the 32 bits of operand-A is applied to the S1 input of a different 4:1 mux in vectored mux 10, while each bit of operand-B is applied to the corresponding S0 input. Thus the individual 4:1 mux which generates bit-position 6 of the result RESULT<6>, has its S1 select input connected to bit 6 of operand-A OP-A<6>, while its S0 select input is connected to bit 6 of operand-B OP-B<6>. Other individual 4:1 muxes in vectored mux 10 are connected in the same fashion.

The data inputs D3, D2, D1, D0 of vectored mux 10 are connected to truth-table signals, designated TT3, TT2, TT1, TT0. These truth-table signals are each 32-bits wide, for connecting to the 32 individual 4:1 muxes in vectored mux 10. These truth-table signals are also abbreviated as B3, B2, B1, B0 to indicate a Boolean function may be input.

For a simple Boolean function without any sign-extension, all 32 signals are identical in the truth-table signals applied to one of the data inputs. Thus for AND operations, all 32 bits in TT3<31..0> are one, while all 32 signals in each of TT2, TT1, and TT0 are zero. Since these bits are the same for all 32 positions, only four bits for any Boolean function need to be stored or generated to drive the data inputs of vectored mux 10. When sign-extension is combined with a Boolean function, then additional bits may need to be stored, as was described in detail in the grand-parent patent, U.S. Pat. No. 5,443,577.

Sign-extension can be performed as described in the grand-parent patent by dividing each set of truth-table signals into an upper and a lower section, and modifying the upper section to account for the sign extension. Thus sign-extension is accounted for in the truth-table signals themselves.

RISC ROTATE-MERGE INSTRUCTION

FIG. 2 illustrates the operation performed by a RISC rotate-merge instruction. The RISC PowerPC™ architecture provides a wealth of useful instructions, including merge instructions. Merge instructions in their simplest forms may be used to read or test a bit or a field of bits in a register. The bits read can be extracted to a different register where further processing can be performed using the extracted bits. While many forms and variations of these merge operations exist, FIG. 2 highlights one of the more complex of the merge instructions, rlwimi.

The merge instruction rlwimi is the "rotate-left word immediate then mask-insert" instruction. A 32-bit "word" is rotated to the left by the rotate amount "n" which is specified in the instruction word as shown in FIG. 2. Since this rotate amount "n" is contained in the instruction word itself, rather than in a register, the rotate amount is an "immediate" constant. The rotate is performed on a 32-bit source operand from the rS register identified by the rS field in the instruction word. A mask is then generated beginning with the bit identified by field MB and ending with the bit indicted by field ME. The rotated operand is then merged with a second operand in register rA, specified by field rA of the instruction word. The portion of rotated rS between MB and ME is merged into the operand in register rA.

FIG. 2 shows a first operand in register rS having a least-significant-bit (LSB) with the value "X" at bit-position 0. A left rotate by n bits shifts the LSB X over to bit-position n as shown. For a left-rotate the MSB's shifted out from bit-position 31 are rotated back to the LSB. A mask is generated from fields MB, ME by loading a temporary register with ones between MB and ME, but zeros elsewhere. This mask can be used as the control input to a mux which selects the rotated rS operand when the mask for that bit-position is one, but selects the rA register's bit when the mask bit for that bit-position is zero.

Several bits can be extracted from register rS and inserted into register rA using rlwimi. The merge instruction can extract one bit or 32 bits or any number of bits between 1 and 31. Rotating first allows these bits to be placed anywhere in the rA register.

EXECUTING RISC ROTATE-MERGE INSTRUCTION ON A VECTORED MUX

Figure 3:
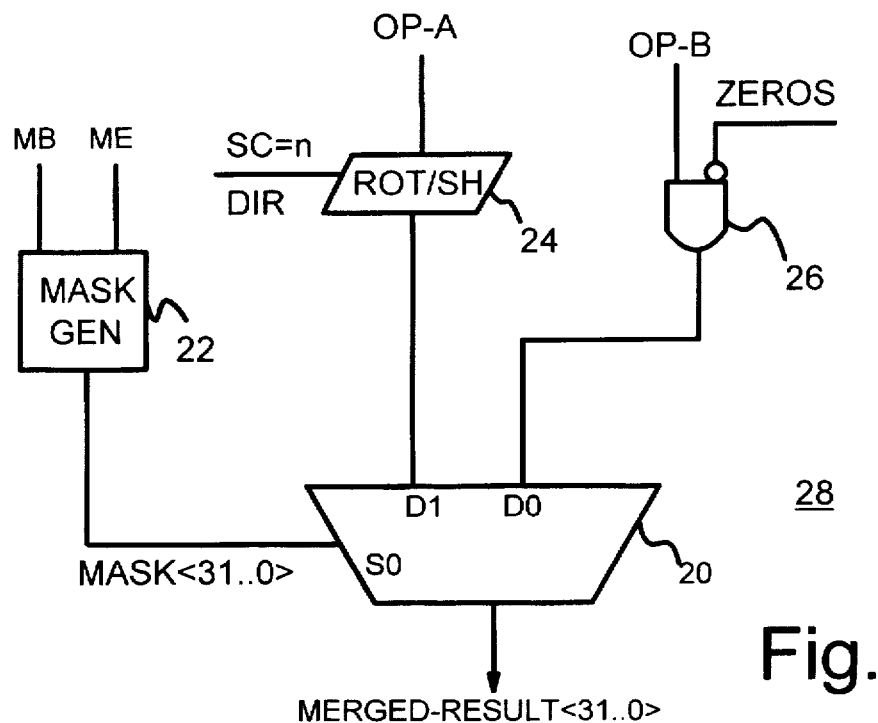
FIG. 3 shows a vectored mux which is modified to execute rotate-merge instructions as described in the parent application.

FIG. 3 shows a vectored mux which is modified to execute rotate-merge instructions as described in the parent application. Vectored mux 20 is comprised of 32 individual 2:1 muxes, one for each bit-position. Operand-A is first shifted or rotated by rotator 24, which has control inputs determining the number of bits to shift, the shift count (SC) having the value "n", and the direction of the rotate, left or right. The rotated 32-bit output from rotator 24 is received by vectored mux 20 on the D1 data input.

Operand-B is input to vectored mux 20 on its D0 data inputs after an optional zeroing by AND gates 26. For the rlwimi instruction, AND gates 26 simply pass operand-B through. Another rotate-merge instruction, rlwinm, performs an AND with the mask rather than merge the rotated operand-A into operand-B. Any mask bits that are zero, before MB and after ME, cause the result of rlwinm to be zero. Thus operand-B is zeroed out before input to vectored mux 20.

Mask generator 22 receives the beginning and ending mask fields MB, ME from the instruction decoder, and generates the mask. Ones are generated for bits between MB and ME, with the other bits being zero. Simple, well-known combinatorial logic may be used to implement mask generator 22. For example, a first mask can be generated using just MB, while a second mask generated using just ME. Simple decoders for each bit-position set the mask bit when the bit-position is less than or equal to MB, or greater than or equal to ME. The two masks are then ANDed to get the final mask. When MB<ME, the masks are ORed rather than ANDed. The generated mask, MASK<31..0>is input to the select control input of vectored mux 20, with each mask bit controlling an individual 2:1 mux. When the mask bit is high for a bit-position, D1 is selected and rotated operand-A is selected as the result output. When the mask bit is low for a bit-position, operand-B is selected as the result output (or zeros from AND gates 26 for rlwinm).

Vectored mux 20, mask generator 22, rotator 24, and AND gates 26 together form merge unit 28 for performing merge and rotate operations.

BOOLEAN VECTORED MUX USED FOR MERGE OPERATIONS

The inventors have realized that the merge unit and the Boolean unit can be combined. The 4:1 mux for the Boolean unit can be controlled as a 2:1 mux to perform merge operations. Thus the same hardware mux can be used for two functions, reducing cost and complexity. Since both of these muxes are vectored muxes, reducing the number of vectored muxes also reduces complexity for mux control logic.

A 4:1 mux may be logically reduced to a 2:1 mux by applying a constant to one of the two select inputs. When a constant zero is applied to the S0 input, data inputs D1 and D3 are never selected. Data input D0 is selected when S1 is low, while data input D2 is selected when S1 is high. The 4:1 vectored mux, useful for performing Boolean operations, can also be used as a 2:1 mux for merge operations.

Another major difference between the vectored 4:1 mux for Boolean operations and the 2:1 mux for merge operations is that the operands are input to the select control inputs for Boolean operations, but to the data inputs for merge operations. Additional control logic is needed to route the operands to the control inputs for Boolean operations but to the data inputs for merge and rotate operations. The mask and a constant must be routed to the select control inputs for merge operations.

BYTE SPREADER FOR CISC OPERATIONS

Figure 4:
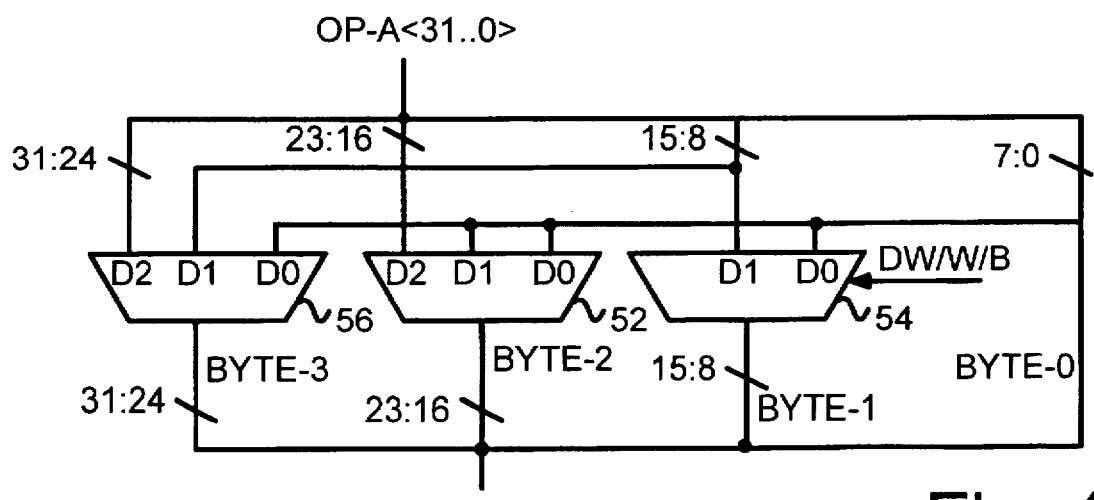
FIG. 4 is a byte spreader which is used for extending CISC operands.

FIG. 4 is a byte spreader which is used for extending CISC operands. Byte-spreaders are well-known in the art. CISC instructions often use 8-bit (byte) or 16-bit (word) operands while RISC instructions always use 32-bit (double-word, DW) operands. Since the vectored mux and merge unit is designed for 32-bit RISC operands, smaller CISC operands are either sign-extended or spread to 32 bits. Sign extension copies the sign bit to the upper bit-positions. Byte-spreading, on the other hand, copies an entire byte or 16-bit word to the upper bit-positions. For example, the byte-operand 10101111 may be sign-extended to

11111111_11111111_11111111_10101111, but byte-spread to

10101111_10101111_10101111_10101111.

Byte-spreading is preferable for operands that are input to shift and rotate operations since a 32-bit rotate requires no other special muxing or correction. For example, a 2-bit rotate of the byte 10101111 results in 10111110, which can be generated from an 8-bit rotator, or from a 32-bit rotator when the byte input is byte-spread to 32-bits.

Byte-spreader 11 of FIG. 4 takes operand-A and divides it into four bytes. The highest byte, bits 31:24, is input to input D2 of mux 56. The third byte, bits 23:16, is input to input D2 of mux 52. The second byte, bits 15:8, is input to input D1 of mux 56 and input D1 of mux 54. The low byte, bits 7:0, is input to inputs D0 of muxes 56, 52, 54 and also input to input D1 of mux 52. Mux 56 selects the upper byte, mux 52 selects the third byte, and mux 54 selects the second byte of the byte-spread output. The low byte is connected directly to the low byte of the output.

The select control inputs to muxes 56, 52, 54 indicate if operand-A is a byte, word, or double-word operand. A byte operand selects inputs D0 from all three muxes, which selects the low byte to be output for all four bytes of the output. A word operand selects inputs D1 from all three muxes, copying the low byte to the third byte, bits 23:16, and copying the second byte to the upper byte, bits 31:24. Thus the 16-bit word operand is copied to the upper 16 bits of the output. When a double-word operand is used, muxes 56, 52 select the D2 input, passing the upper and third bytes to the output, while mux 54 selects the D1 input, passing the second byte to the output.

Thus byte-spreader 11 spreads or copies a byte operand to the upper three bytes, or copies a 16-bit word operand to the upper two bytes. Full-width double-word operands simply pass all 32 bits through with no change. Thus 32-bit RISC operands are not modified by byte spreader 11.

COMBINED BOOLEAN AND MERGE UNIT USING VECTORED MUX

Figure 5:
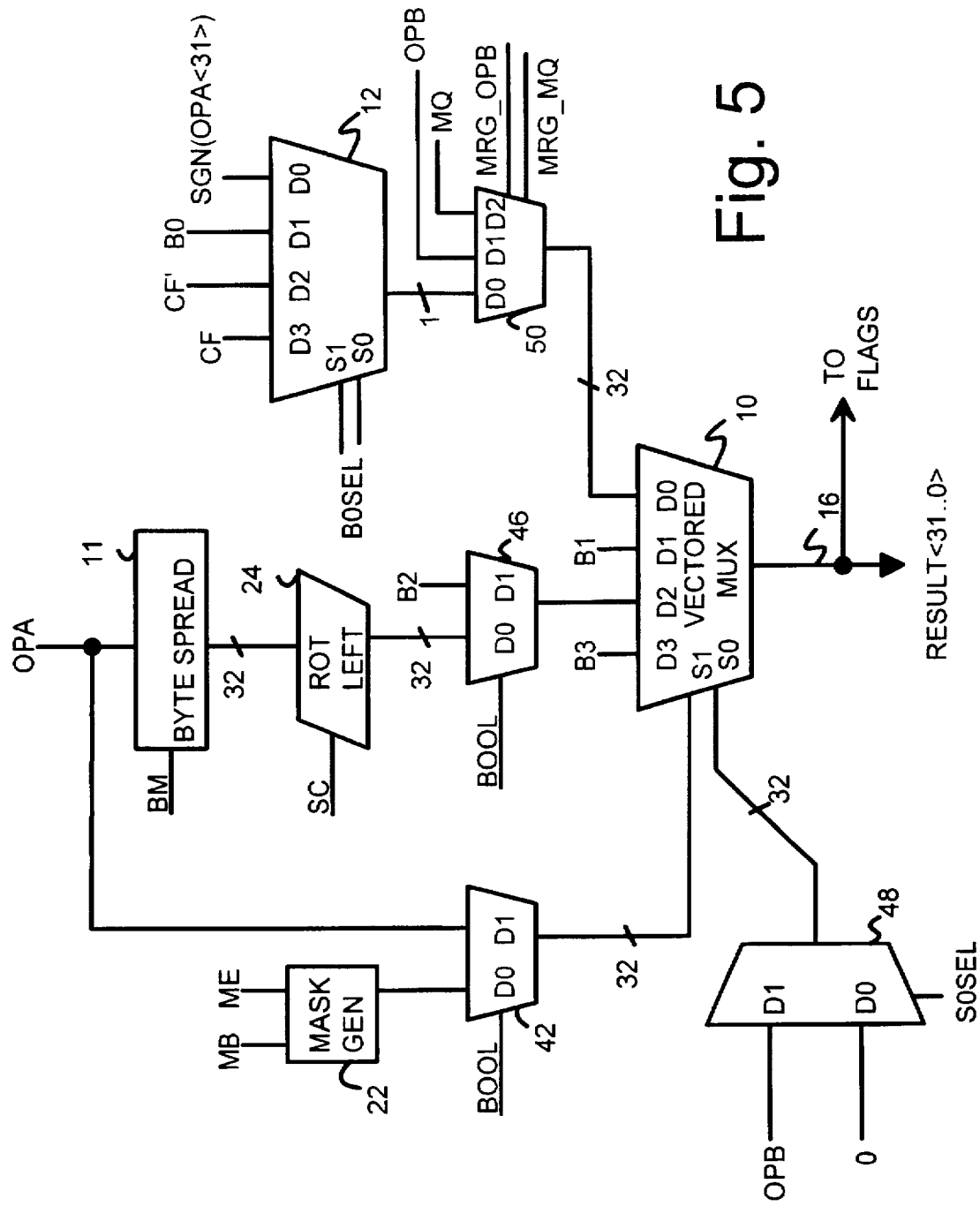
FIG. 5 shows an execute unit with a vectored mux for executing Boolean logic operations, rotate, merge and bit-test operations for both RISC and CISC instructions.

FIG. 5 shows an execute unit with a vectored mux for executing Boolean logic operations, rotate, merge and bit-test operations for both RISC and CISC instructions. Vectored mux 10 is comprised of 32 individual 4:1 multiplexers or muxes as described for FIG. 1. When truth table inputs B3, B2, B1, B0 are coupled to the data inputs D3, D2, D1, D0 and operands A and B are coupled to the select control inputs S1, S0 of vectored mux 10, then the Boolean function encoded in the current truth-table signals is performed on operands A and B. Other Boolean functions are performed simply by applying a different set of truth-table signals to B3:B0, as described in detail in the grand-parent Pat. No. 5,442,577, where tables 1–4 showed truth-table signals for various Boolean functions such as AND, OR, XOR, A ANDNOT B.

For Boolean operations, signal BOOL is high, causing mux 46 to select vector B2 while mux 42 couples operand-A to the S1 control input of vectored mux 10. S0SEL is set high to connect operand-B to the S0 control input of vectored mux 10. Truth-table vector B0 is connected to data input D0 through muxes 12, 50 by setting B0SEL high and MRG_OPB and MRG_MQ low. Thus vectored mux 10 is connected properly for Boolean operations.

The instruction decoder at the beginning of the pipeline decodes the instruction's opcode to determine what type of operation is called for. Boolean operations are further decoded into the exact Boolean operation just before the pipestage containing the ALU, although may variations of the decoding are possible. The Boolean operation decoded then selects the correct set of truth-table vectors to apply to B3:B0. For Boolean operations without a sign-extend, a single bit for each of the four truth-table vectors is generated and spread out over all 32 bits. Boolean operations with a sign-extended operand require two bits for each vector, one for the lower section and a second for the upper section, as was described in the grand-parent patent in Tables 5–9. Two copies of mux 12 are needed when the truth-table inputs are divided into an upper and a lower section. The four or eight truth-table bits may be read from a small ROM or generated by a programmable-logic array (PLA) or other decoding logic.

For merge operations, the connection of the operands to the vectored mux is reversed. Instead of applying the operands to the select control inputs as for Boolean operations, the operands are applied to the data inputs. When two operands are used, operand-B is applied to data input D0 through mux 50, which has MRG_OPB set high and MRQ_MQ low. Operand-A is applied to data input D2 through mux 46, which has BOOL set low for merge operations. Operand-A is first byte-spread by byte-spreader 11 and then rotated or shifted by rotator 24 before being input to mux 46 and vectored mux 10.

Rotator 24 is preferably a simple barrel rotator, allowing a rotate of any number of bits to be performed in a single step. The number of bit-positions rotated is determined by the shift count SC, which can be read from a register or as an immediate value in the instruction itself. The direction of the shift or rotate, either left or right, is also determined by the instruction and input to rotator 24 as is the type of operation, either a shift or a rotate (not shown). The type and direction of shift/rotate is usually determined by the opcode itself. A rotate is a shift with the MSB looped back to the LSB for a left rotate, or the LSB looped back to the MSB for a right rotate. Shifts do not loop the MSB or LSB back, but simply drop bits that are shifted off the end. Zeros are shifted in the other end, except for arithmetic right shifts, which shift in the sign bit, which is the original MSB. An alternate embodiment described later uses a simple rotator with the masking and merging features of the vectored mux to accomplish both rotates and shifts.

For simple rotate or shift operations, vectored mux 10 just passes the rotated operand-A through to the result. Data input D2 from rotator 24 is selected by forcing S1, S0 to 10 in all bit-positions. Mask generator 22 defaults to output 32 bits of ones when no mask operation is being performed. BOOL is low for non-Boolear operations, coupling the one outputs from mask generator 22 to S1 control input through mux 42. S0SEL is also set low, causing mux 48 to select a zero to S0. For more complex instructions, the rotated operand-A can then be merged or masked using vectored mux 10. Simple mask and merge operations can also be performed by setting the shift count to zero for rotator 24.

Mask generator 22 receives the beginning and ending bit-positions of the mask or merge, MB, ME, which can each be encoded by 5-bit fields in the instruction word. Mask generator 22 generates a 32-bit mask which has ones between and including MB and ME, but zeros elsewhere. This mask is selected by mux 42 when BOOL is low, and applied to select input S1 of vectored mux 10. The other select input, S0, is driven by 32 zeros from mux 48 as signal S0SEL is low. Thus data inputs D3 and D1 cannot be selected as S0 is low for all 32 bits. Vectored mux 10 is logically reduced from a 4:1 mux to a 2:1 mux for merge operations.

SC, MB, and ME can be provided from decoding or control logic based on the type of instruction or can be provided directly in the instruction word. For example, a sign-extend byte instruction would set SC=0, MB=7, ME=0, thus merging bits 31 to 8 of its operand with a sign bit, if selected.

For the bit positions between MB and ME, in the masked portion, a one is output to select input S1, and thus data input D2 is selected. However, for bit positions outside of the masked portion, a zero is output to S1, and data input D0 is selected. D2 receives the rotated operand-A, while D0 receives operand-B through mux 50, which has MRG_OPB set for two-operand merge operations. Thus operand-A, possibly rotated by rotator 24, is merged into operand-B using vectored mux 10. The mask determines which bits of the result originate from each operand.

A simple mask or merge occurs when the shift count SC is set to zero, while a rotate-merge (rlwimi) or a shift-merge operation occurs when SC is non-zero. A mask operation differs from a merge in that only one operand is used for a mask, but two for a merge. For a mask operation, bit-positions not between MB and ME are cleared to zero. Thus a mask operation is simply a merge with a zero-filled register.

Mask operations are performed by applying 32 zeros to data input D0 rather than applying the second operand-B. MRG_OPB and MRG_MQ are set low for mask operations, while the B0SEL bits are set to 01, causing truth-table vector B0 to be applied to data input D0 through muxes 12, 50. Bit B0 is set to zero, which is spread to all 32 bits for the mask operation. Thus zeros are merged with operand-A when a mask operation such as rlwinm is performed.

An explicit sign-extension operation for RISC instructions is performed on a single operand, operand-A, by applying operand-A, possibly after a rotate by rotator 24, to data input D2 through mux 46 which has signal BOOL low. Mask generator 22 generates a vector for the operand size as described for FIG. 2 of the parent application, with one bits where the operand-A has significant bits, but zero bits where sign-extension is to occur. This operand-size vector is applied to select control input S1. Signal S0SEL is low, forcing a constant zero onto select input S0 so that only data inputs D0 or D2 can be selected.

Signals MRG_MQ and MRG_OPB are low since a second operand is not being merged in. Mux 50 couples the output from mux 12 to data input D0 of vectored mux 10. For sign-extension, both bits of signal B0SEL are low, selecting the sign bit, the MSB of operand-A, to data input D0 of vectored mux 10. Zero-extension is performed by setting truth-table signal B0 to zero, and B0SEL to 01, so that zeros are applied to data input D0 of vectored mux 10.

The S1 input to vectored mux 10 is driven by a vector of the operand size, with one bits where the operand exists and zero bits for the extension part of the 32-bit result. Thus an 8-bit byte operand being extended to 32 bits has the vector 00000000 00000000 00000000 11111111 driven to select input S1. The zero bits select the sign bit from mux 12 and data input D0, while the one bits select the shifted or un-shifted operand-A from data input D2. Thus sign-extension is performed by merging the operand with the sign bits using vectored mux 10 to perform the merge.

Result output 16 from vectored mux 10 can be used to generate flags for the ALU result. For example, comparing result output 16 to zero generates the 'Z' flag.

RISC Vectored Mux BLU Modified Slightly For CISC

The inventors have realized that the vectored mux Boolean-logic unit (BLU) can be extended slightly to allow not only RISC instructions, but also CISC instructions to be natively executed. The vectored mux approach is so surprisingly versatile and flexible that even CISC operations can be performed on an otherwise RISC BLU.

For CISC instructions, the basic RISC execute unit described in the parent application is extended only slightly. As FIG. 5 shows, byte spreader 11 is an added element, and mux 12 is changed from a 2-input mux to a 4-input mux to allow the carry flag CF and its complement CF' to be merged in instead of the sign bit, zero or one. In addition to OP-B, MQ also needs to be a merge source. These three simple changes allow complex CISC operations to be executed on the otherwise RISC BLU.

SIMPLIFIED EMBODIMENT OF ROTATOR FOR SHIFT OPERATIONS

For an arithmetic shift right instruction, sign-extension is required. Vectored mux 10 and mask generator 22 are used to perform an arithmetic shift by adjusting the rotated output from rotator 24. The instruction decoder sets shift count SC to n, the number of bits to shift. ME is set to 0, while MB is set to 31-n. The sign bit is selected by mux 12 for the merge rather than zeros. Vectored mux 10 merges the sign bit from mux 12 to the MSB's of the result above MB. Rotator 24 simply rotates by the shift count SC, even for shift operations. Thus rotator 24 can be used for both rotates and shifts by always rotating in rotator 24, but using the merge/mask features of vectored mux 10 to generate the shift result from the rotated output.

The direction control for rotator 24 can also be eliminated by adjusting shift count SC. Rotator 24 is designed to always rotate left. For right rotates and shifts, the shift count SC is simply complemented in modulo 32. Thus a right shift by 2bit-positions is complemented to a left shift by 30 bit positions. Of course, rotator 24 could default to either right or left shifts/rotates, and the modulus can be changed for different data-path widths.

A shift left by a shift of "n" is thus accomplished by setting:

SC=n

MB=0

ME=n

Merge with zeros.

A shift right by a shift of "n" is accomplished by setting:

SC=two's complement of n

MB=31-n

ME=0

Merge with zeros for logical shift, but merge with sign bit for arithmetic shift.

Thus the mask/merge features of vectored mux 10 and surrounding logic can be used to adjust the output from a simplified rotator 24 which can only rotate in one direction. This reduces cost and complexity as a simpler rotator is used rather than a more versatile and complex bi-directional rotator/shifter.

EXAMPLES OF CISC OPERATIONS PERFORMED ON BLU

The operation of the RISC/CISC ALU of FIG. 5 will now be described for several complex CISC operations. Simple CISC operations that resemble RISC operations can be directly executed in the same manner as the corresponding RISC operation is executed. CISC operands of 8 or 16 bits are first byte-spread to 32-bits by byte spreader 32.

For example, after byte-spreading the CISC shift instructions SHL, SHR and SAR are simple shifts that are executed in the same manner as the RISC shift instructions slw, srw, sraw. (RISC instructions are listed in lowercase letters while CISC instructions are listed in uppercase letters.) The CISC rotate instructions ROL, and ROR are simple rotates that are executed in the same manner as the RISC rotates rlwimi, rlwinm, rlwnm, except that no merging or masking is performed.

The following PowerPC™ RISC instructions are executed by the vectored mux and merge BLU:

Boolean Instructions: and, andc, nor, eqv, xor, orc, or, nand

Sign-Extend Instructions: extsh, extsb

Shift Instructions: slw, srw, sraw

Mask/Merge Instructions: rlwimi, rlwinm, rlwnm

These RISC instructions are executed in a single clock cycle. Even the mask/merge instructions are executed in one clock cycle because rotates and shifts can be performed before the merging and masking in a single pass through the vectored mux BLU. Any arbitrary Boolean function can be performed by inputting appropriate truth-table signals to the data inputs of the vectored mux, as described in detail in the grand-parent patent. RISC sign-extensions are executed as a merge operation, with the sign bit merged into the vectored mux through mux 12 of FIG. 5. The mask generated has a field of ones for the size of the un-extended input operand, and zeros for the upper, extension bits.

The following simple x86 CISC instructions are also executed in a single clock cycle:

| MOVZX, MOVSX | move zero-extended or sign extended |
|---|---|
| CBW, CWDE | Sign-extend a register operand |
| ROL, ROR | Rotates left or right |
| SHL, SHR | Shift left or right (logical) |
| SAR | shift arithmetic right |
| BT | Bit test |

Sign-extension for CISC instructions are preferably performed as a Boolean operation as described in the grand-parent patent. MOVes are to or from memory while CBW, CWDE are sign-extensions on a register operands. Since these CISC instructions are relatively simple, they can be performed on a single pass through the vectored mux.

Other x86 instructions are more complex, and require multiple passes through the vectored mux BLU. These multi-step instructions include:

| RCL, RCR | Rotate through carry left or right |
|---|---|
| SHLD, SHRD | Shift double |
| BTC, BTR, BTS | Bit test and modify |

These are compound instructions which perform complex operations and thus require two or more cycles to execute.

Any of these CISC instructions, whether single or multi-step, can operate on reduced-width operands. Byte spreader 11 of FIG. 5 is used to first spread a byte operand to 32 bits, or a 16-bit word operand to 32 bits. The register file or bus interface unit is sent the desired size of the result, either byte, word, or 32-bit double-word. The desired size of the result is used to enable the desired bytes when writing the result to a register or memory. Thus a byte-rotate ROL would byte-spread the byte operands to 32-bits, perform the rotate, and then store only the low 8 bits of the result back to a result register.

COMPLEX CISC INSTRUCTIONS

Figure 6:
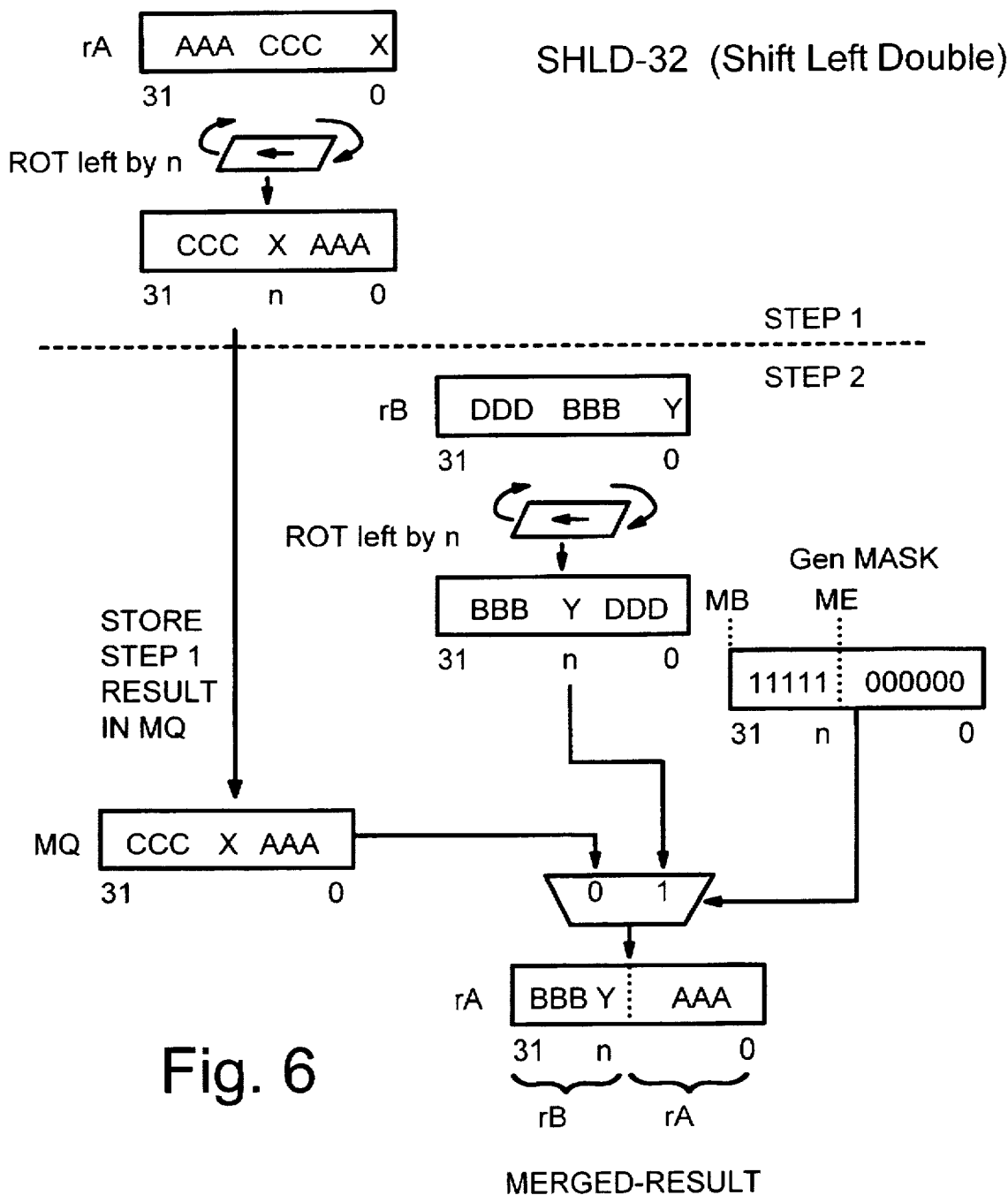
FIG. 6 illustrates execution of the CISC shift-double instruction (SHLD) by the vectored-mux BLU.

FIG. 6 illustrates execution of the CISC shift-double instruction SHLD by the vectored-mux BLU. The shift-double instruction performs a shift across two operands located in two different registers.

For example, register rA contains the lower operand AAACCCX, while register B contains the upper operand DDDBBBY. In concept, the two operands are put together with rA forming the lower bits and rB forming the upper bits.

DDDBBBY AAACCCX

The shift is performed on the two registers as a single unit. Bits shifted out of the lower register rA are shifted into the upper register rB for a left shift. The final contents of the upper register rB are stored as the result:

BBBYAAA

The lower-bit result of a left-shift-double of n positions is CCCXAAA. The lower bits (AAA) are stored as part of the result while the upper bits (CCCX) are discarded. The upper-bit result is BBBYDDD, with the upper bits BBBY forming part of the result and the lower bits (DDD) discarded. The upper and lower operands may be byte, word, or double-word operands, and the result is the same size as one of the input operands.

FIG. 6 shows that two shifts are required, using two clock cycles through the vectored mux BLU. During the first cycle or step, operand AAACCCX in register rA is rotated to the left by the shift count n. The intermediate result (CCCXAAA) is stored in temporary register MQ and input to the vectored mux at port D0 with MRG_MQ high selecting MQ in the second step as a merge input. During the second step the upper operand DDDBBBY in register rB is rotated to the left by n. The rotated upper operand is also input to the vectored mux as a first merge input through port D2.

A merge mask is generated having n zeros in the lower bit-positions but ones in the upper bit-positions (MB=31 and ME=n). The merge mask controls the vectored mux because it is input to the select control input of the vectored mux. The merge mask causes the vectored mux to select the rotated lower n bits of the lower operand (AAA) from temporary register MQ, while the upper bits of the rotated upper operand (BBBY) are selected as the upper part of the result, BBBYAAA.

Right-shift-double (SHRD) operates in an analogous manner. The first step rotates to the right the upper operand and saves it to MQ. In the second step the lower operand is rotated right and merged with the rotated upper operand from MQ. The lower portion of the merged result is saved. Thus the complex shift-double CISC instruction can be executed on the vectored-mux BLU in two steps.

ROTATE-TRHOUGH CARRY—FIG. 7

Figure 7:
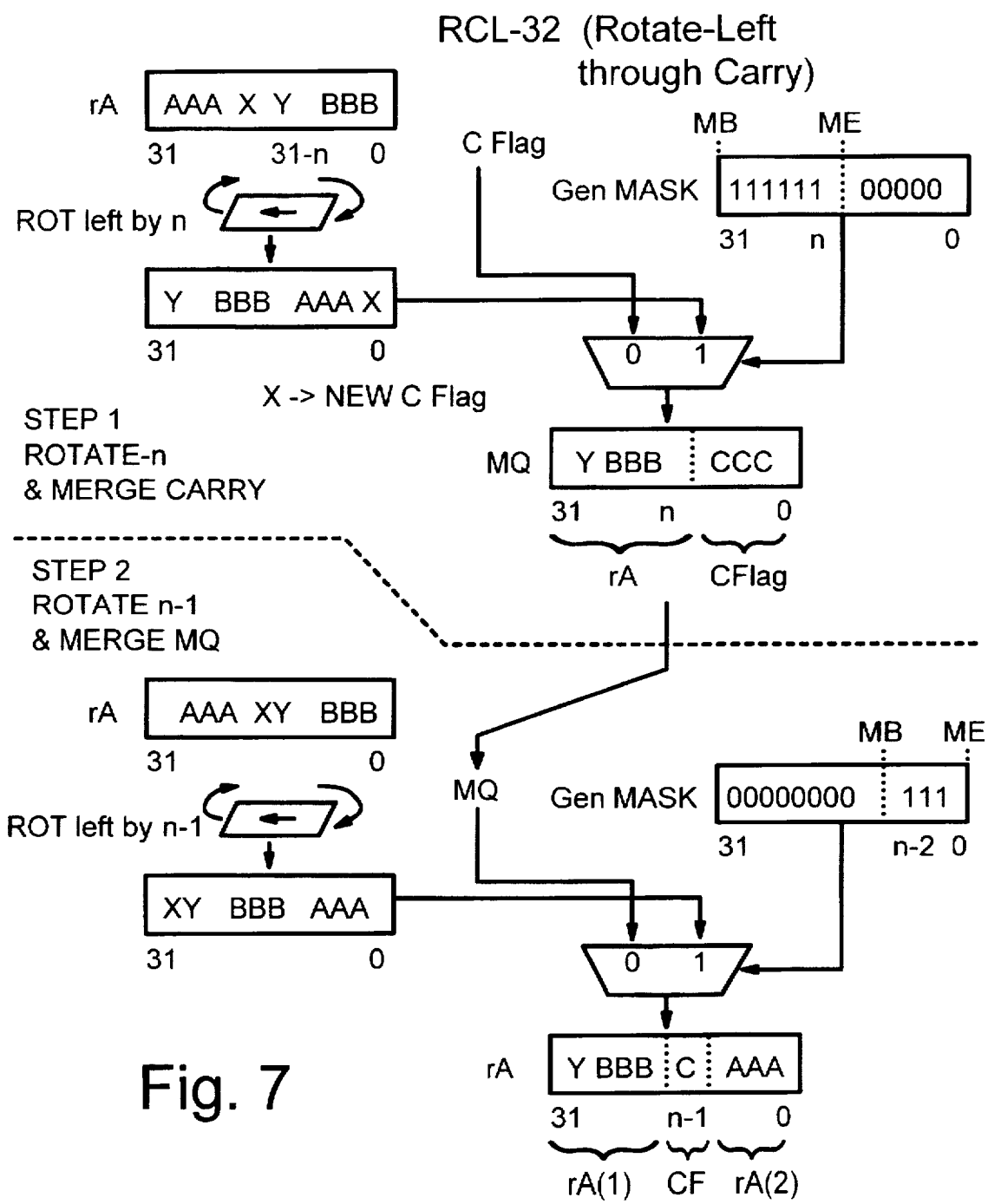
FIG. 7 illustrates execution of the CISC rotate-through-carry instruction (RCL) by the vectored mux BLU.

FIG. 7 illustrates execution of the CISC rotate-left-through-carry instruction on the vectored mux BLU. The rotate-through-carry instruction differs from ordinary rotate instructions because the carry bit from the flag register is inserted at the bottom of the operand before the rotate is performed. The carry bit is set by a previous instruction.

In concept, the operand:

AAAXYBBB is first appended with the carry flag C:

AAAXYBBB_C.

The carry flag is not part of the 8, 16, or 32-bit operand, but instead is a separate, additional bit. The rotate is performed on the operand and the carry flag. A 32-bit operand thus rotates through 33 bits, including the carry bit. The result of a right-rotate-through carry by n is:

YBBBCAAA_X with the carry bit C at bit-position n-1 of the result. The original bit "X" is now the new carry flag and is not part of the data result stored.

FIG. 7 rotates the operand AAAXYBBB with the original carry flag "C". In step one, the operand is rotated to the left by n, producing the first rotated value

YBBBAAAX which is input to input D2 of the vectored mux. The new carry flag is set to the lowest bit of the rotator output, bit 0 which is "X". Note that the simplified rotator only rotates through 32 bits and does not include the carry bit as a 33rd bit in the rotate loop.

The original carry flag "C" is a single bit that was set by execution of a previous instruction such as an earlier ADD instruction. This single carry bit is spread from one bit to 32 bits and transmitted to input D0 of the vectored mux. Spreading to 32 bits can be accomplished by simply connecting the output of mux 12 to all 32 inputs of mux 50 of FIG. 5.

The mask generated in step one has MB=31 and ME=n, so ones are generated for bits 31 to and including bit n, with bits n-1 to 0 being zeros. The upper ones in the mask select inputs D2 of the vectored mux, which is the rotated operand. The lower zero bits of the mask select copies of the carry bit. The merged output of the vectored mux for the first step is therefore

YBBBCCC which is stored in the MQ temporary register and sent to input D0 of the vectored mux in step two.

The original operand is again sent to the rotator in step two, but this time it is rotated left by n−1. The first step rotated by n. The second rotated result is

XYBBBAAA which is sent to port D2 of the vectored mux for merging with the first step's result stored in register MQ. The mask generated for the second step has MB=n−2 and ME=0, so zeros are generated for the upper mask bits, which select the result from step one. The lower mask bit are ones, selecting the second step's rotator output. Since the first one in the mask is at bit-position n−2, while the first carry bit from step one is at bit-position n−1, there is exactly one carry bit in the final answer, at bit-position n-1:

YBBBCAAA.

The upper bits of the final result are from the first step while the lower bits are from the second step. Thus reducing the rotate value for the second step and adjusting the mask generated inserts the carry bit at the proper bit-position, mimicking a 33-bit rotate through the carry bit.

The first step uses a standard, quickly-generated mask that is used for simple one-step shifts. This is the same mask used for shift-left. The second step used a non-standard mask which takes more time to generate. Thus the first step is easier to execute and not time critical, while additional time is available for generating the second step's mask.

For 16-bit rotate-through carry, the shift count n is reduced by modulo 17 to rotate by the proper amount to mimic 16-bit hardware. Byte operands require that the shift count be reduced modulo 9. An RCL with n=9 is thus reduced to n=0. RCR operates in an analogous manner using right-rotates.

BIT TEST & COMPLEMENT—FIG. 8

Figure 8:
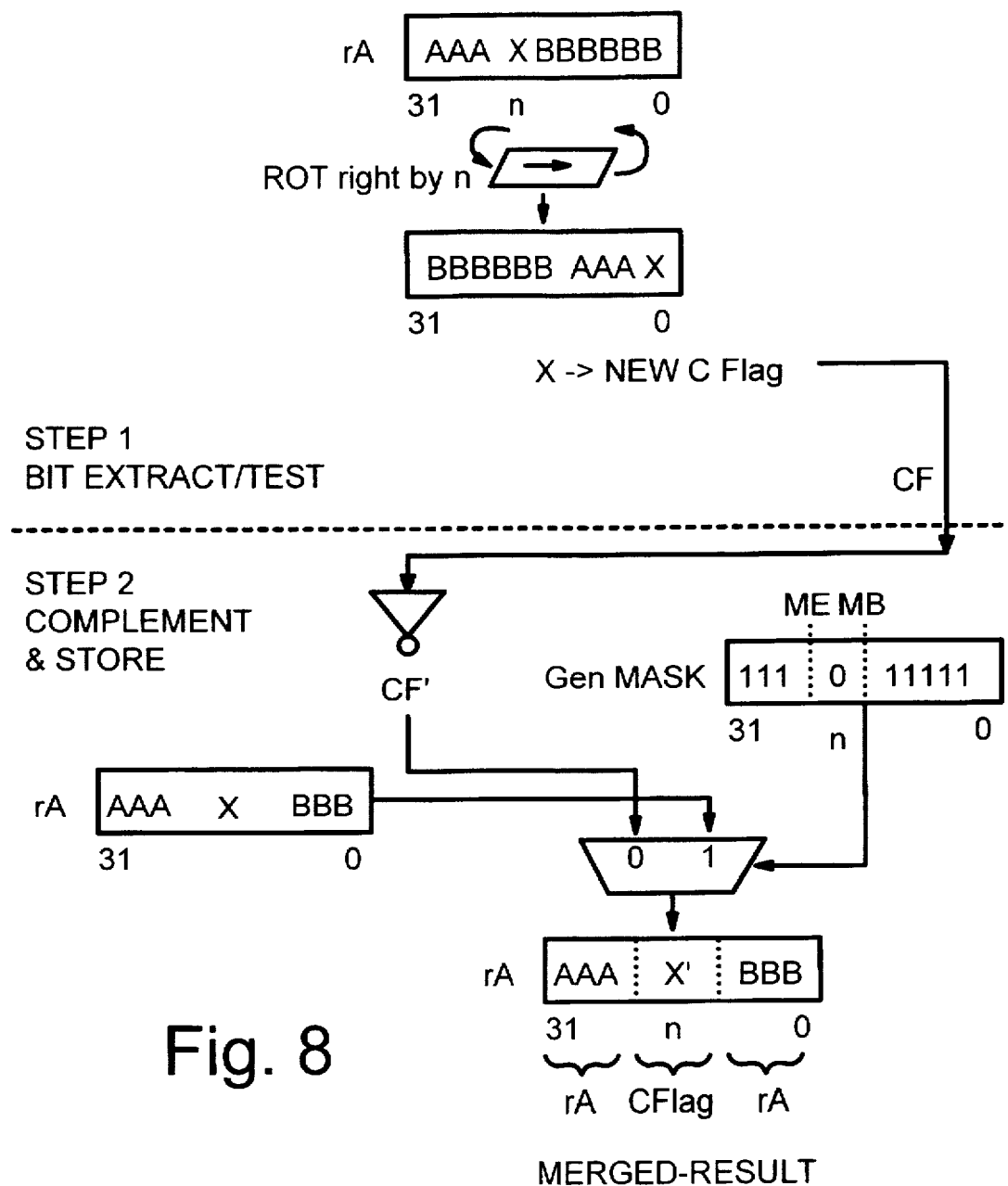
FIG. 8 illustrates execution of the CISC bit test and complement instruction (BTC) by the vectored mux BLU.

FIG. 8 illustrates execution of the CISC bit test and complement instruction (BTC) on the vectored mux BLU. A bit test instruction copies one bit of an operand to the carry bit of the flags register. Any bit of a 32-bit, 16-bit, or 8-bit operand may be tested. The BTC instruction then complements the bit tested and writes the complement back to the tested bit. For example, the operand:

AAAXBBBB where bit "X" is to be tested and complemented is updated by BTC to

AAAX'BBBB where X' is the logical complement of bit X.

Since a rotate-left operation loads the carry flag with a copy of the lowest bit of the rotated result (the last bit shifted out), the rotator of the vectored mux BLU can be used to test the bit. The merge function of the vectored mux BLU can then be used in a second step to merge the complemented bit into the operand. The x86 architecture requires that the lowest bit of the rotated result for a rotate left be copied to the carry flag.

FIG. 8 shows that in the first step the operand

AAAXBBBBBB is rotated to the right by the tested bit's position, n. This places the tested bit, X, at position 0:

BBBBBBAAAX.

Bit X at position zero of the rotator's output is then copied to the carry flag CF of the flags register. A temporary register in the BLU for the carry flag may also be used as the source of CF for step two.

In step two, the carry flag is complemented to CF', input to mux 12 of FIG. 5, and spread from one bit to 32 bits by mux 50 before being sent to port D0 of vectored mux 10. The original, unrotated operand (SC=0) is input to port D2 of the vectored mux. A mask is generated with MB=n−1 and ME=n+1. This generates a mask having all ones except a single zero at position n. This mask selects the complemented carry flag CF' for bit-position n but selects the original operand for all other bits. Thus the complemented carry flag is merged into the final result.

The output of the vectored mux from step one is not stored as it is not needed. Since the mask is not generated until step two, additional time is available to generate the non-standard mask. This helps to reduce critical paths in the ALU.

Other bit-test instructions are similar and can be accomplished in two steps in an analogous manner. Bit-test-and-reset (BTR) rotates the operand in step one and stores the lowest bit as the carry flag. However, in step two the original operand is merged with a zero bit rather than the complement of the carry flag at bit-position n. Bit-test-and-set (BTS) rotates the operand in step one and also stores the lowest bit as the carry flag. In step two the original operand is merged with a one bit rather than the complement of the carry flag at bit-position n. Mux 12 can be used to supply a one or a zero bit instead of the carry flag's complement simply by selecting input D1 and setting the Boolean truth-table bit B0 to zero or one.

Thus several complex CISC instructions are executed in multiple steps by the vectored-mux Boolean logic unit. These complex CISC instructions might otherwise require dedicated hardware for their execution, increasing cost, complexity, and confusion.

RISC & CISC ALU—FIG. 9

Figure 9:
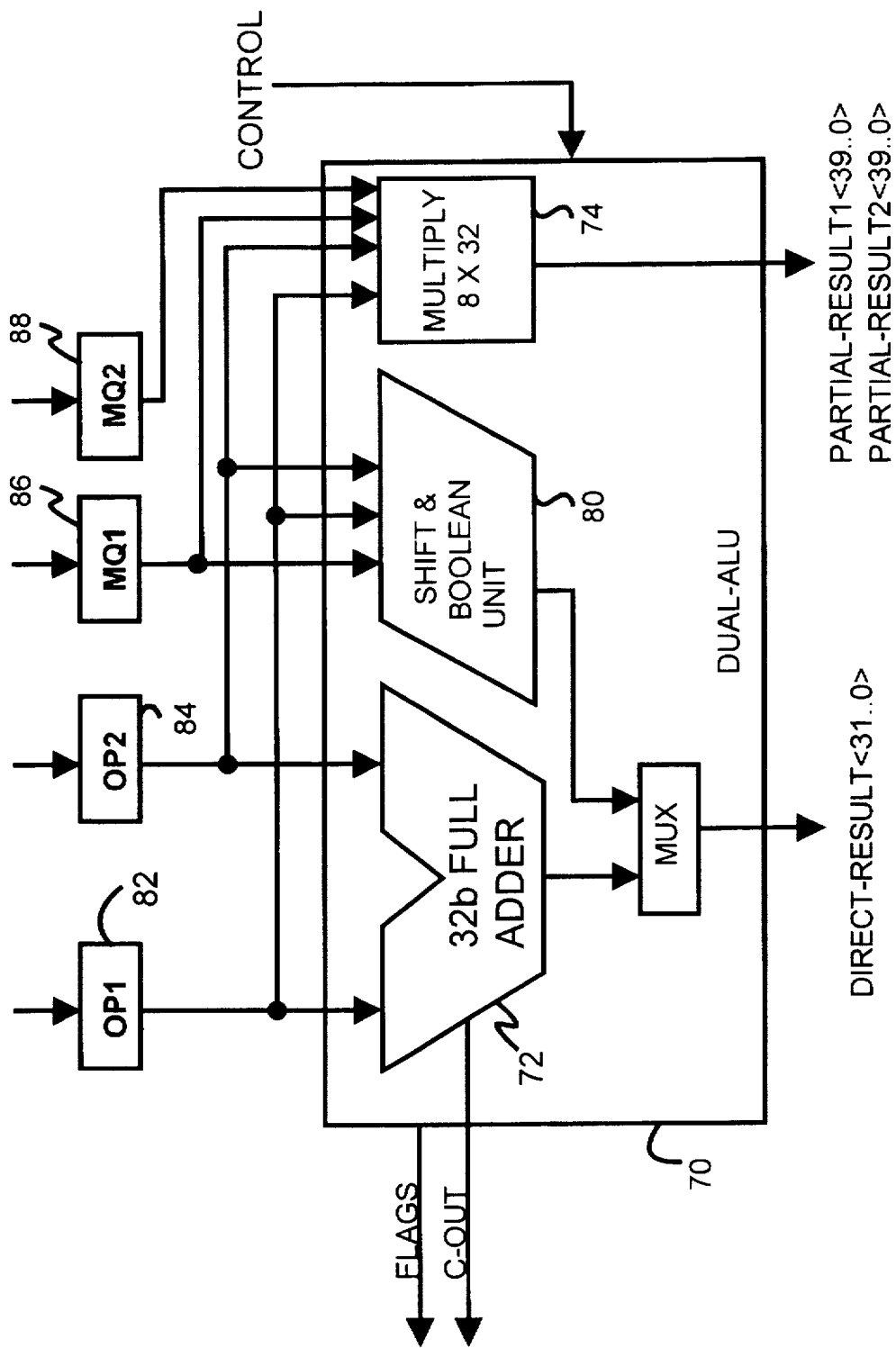
FIG. 9 is a block diagram of an ALU which executes native instructions from both a RISC an CISC instruction set.

FIG. 9 is a block diagram of an ALU which executes native instructions from both a RISC and a CISC instruction set. Dual-ALU 70 includes three main components: a full adder 72, a vectored-mux Boolean logic unit (BLU) 80, and multiplier 74. Full adder 72 generates the sum of two inputs and can also be used for subtraction by adding the two's complement of one input. Both RISC and CISC add instructions may be executed in full adder 72. Multiplier 74 is an 8-bit by 32-bit partial multiplier capable of performing a full 32-bit multiply in four cycles. Both RISC and CISC multiply instructions may be executed in multiplier 74.

BLU 80 is based on the vectored-mux Boolean logic unit of FIG. 5. As described previously, both RISC and CISC Boolean, merge, shift, rotate, and bit test instructions may be executed by BLU 80.

Two input operands are loaded into operand registers 82, 84 which are then input to dual-ALU 70. Two temporary registers 86, 88 are also available for multi-step operations such as multiplies and divides. Thus these temporary registers 86, 88 are labeled MQ1, MQ2 because they contain intermediate results such as the multiplier or partial quotients. As an example of execution of a multi-step divide instruction using an MQ register, see U.S. Ser. No. 08/344, 179, now U.S. Pat. No. 5,574,672 hereby incorporated by reference.

MULTIPLY & DIVIDE TEMPORARY REGISTERS & CONTROL USED FOR CISC

The inventors have realized that the MQ registers for multiply and divide may also be used for multi-step CISC operations such as rotate-through carry and shift-double. Thus FIGS. 6, 7, 8 described storing intermediate results from a first step in the MQ register.

Since dual-ALU 70 supports multi-cycle instructions such as multiply and divide, only minor changes are needed to support multi-cycle CISC instructions. Multi-cycle control logic is already present to perform integer divides and multiplies; this multi-cycle control logic may also be used to control multi-cycle CISC instructions without resorting to complex micro-code routines. Some changes are required in the inputs to input registers 82, 84 and temporary registers 86, 88.

FIG. 10 highlights loading of input register 82, which is the OP1 register. A first operand may be loaded from an immediate field in an instruction, or from a register in a general-purpose register file. The result from dual-ALU 70 may be recirculated back to input register 82, as can the contents of temporary register 86, MQ1. The contents of input registers 82, 84, (OP1, OP2) may also be loaded into register 82 (OP1). Loading register 82 with the previous contents of register 82 is a hold function. Multiplies or divides may load OP1 shifted up by 8 bits.

RISC instructions already require that OP1 be loaded from the result (for forwarding or wrapping the result into a subsequent operation), registers/immediates, the low 32 bits of partial-result1 from the multiplier, and OP1 shifted left by 8 since OP1 is the multiplicand in RISC multiplies. CISC instructions require three more inputs to OP1:

1. OP2 recirculated to OP1
2. OP1 recirculated back to OP1 (Hold)
3. MQ1 loaded to OP1

The bit-test and rotate-through-carry instructions described previously require that the first operand OP1 be used again in the second step and thus OP1 is recirculated back to OP1 at the end of step one for these instructions.

FIG. 11 highlights loading of input register 84, OP2. A second operand may be loaded from an immediate field in an instruction, or from a register in a general-purpose register file. The result from dual-ALU 70 may be recirculated back to input register 82. The contents of input register 84, (OP2) may be recirculated back to register 84 (OP2 Hold). Multiplies may also load OP2 shifted right by 8 bits.

For the second input register 84, OP2, RISC already requires inputs from register/immediate, ALU result, shifted ALU result for divide, OP2 shifted right by 8 bits, and from the low 32 bits of partial-result2 from the multiplier. CISC instructions merely require one more input:

1. OP2 recirculated back to OP2 (Hold)

FIG. 12 highlights loading of temporary register 86, MQ1. The result from dual-ALU 70 may be recirculated back to temporary register 86, MQ1. The contents of input register 84, (OP2) may be recirculated back to register 84 (OP2) after being shifted down by 8 bits. The contents of temporary register 86 may also be recirculated back after a 1-bit shift to the left with a new quotient bit shifted in, which is useful for accumulating the divide result (quotient) in register MQ.

FIG. 13 highlights loading of temporary register 88, MQ2. Either the high or the low partial result from multiplier 74 in dual-ALU 70 is recirculated back to temporary register 88, MQ2.

For the temporary registers 86, 88, (MQ1, MQ2), the partial result from the multiplier is typically loaded for RISC instructions. For CISC, the normal result output from the full adder and BLU is also a possible input to MQ1. Temporary register 86, MQ1, is also input to the BLU for CISC operations instead of just to the multiplier for RISC instructions. This is used for shift-double and rotate-through-carry instructions where the intermediate result from the first step is stored in MQ1 and input back to the BLU for step two.

The operand which is the multiplier, which is the second operand OP2, is normally shifted and loaded into MQ1 during multiplies. For divides, the contents of MQ1 are shifted left one bit for each iteration and reloaded to MQ1. MQ2 is not modified for CISC instructions other than for CISC multiply and divide.

RISC 32-bit multiplies produce a 32-bit result. The partial results are held in MQ1 and MQ2. For 64-bit RISC multiplies, MQ1 and MQ2 hold the upper part of the partial products.

CISC multiplies return a double-size result, 64 bits for a 32-bit multiply. The final multiply step puts the final partial results in OP1 and OP2. When the partial results are added together, the sum is the upper 32 bits of the result. The lower 32 bits of the answer are left in the MQ1 register.

In one embodiment, a 32-bit by 8-bit multiplier is used which produces two 40-bit partial results. A 32-bit by 32-bit multiply can be performed in four passes through the multiplier and a final sum of the partial products. The upper 32-bits of the partial products are temporarily stored in registers MQ1 and MQ2 for each of the four passes through the multiplier. The low 8 bits of the partial products for each pass are summed and shifted right into register OP2, which accumulates the lower 32-bit portion of the result. After the four passes through the multiplier are complete, four 8-bit lower portions of the partial results have been shifted into register OP2, which now holds the lower 32 bits of the result. The MQ1 and MQ2 registers hold the upper 32 bits of the partial products for the last pass through the multiplier. These partial products in MQ1 and MQ2 are summed to get the final upper 32-bits of the result, while the lower 32 bits of the result is read from the OP2 register.

Since MQ1 and MQ2 registers do not directly input to the 32-bit full adder, MQ1 and MQ2 are swapped with the OP1 and OP2 registers before the final add. The lower 32 bits of the result in OP2 is copied to MQ1 as well.

DUAL-INSTRUCITON-SET PIPELINE

Figure 14:
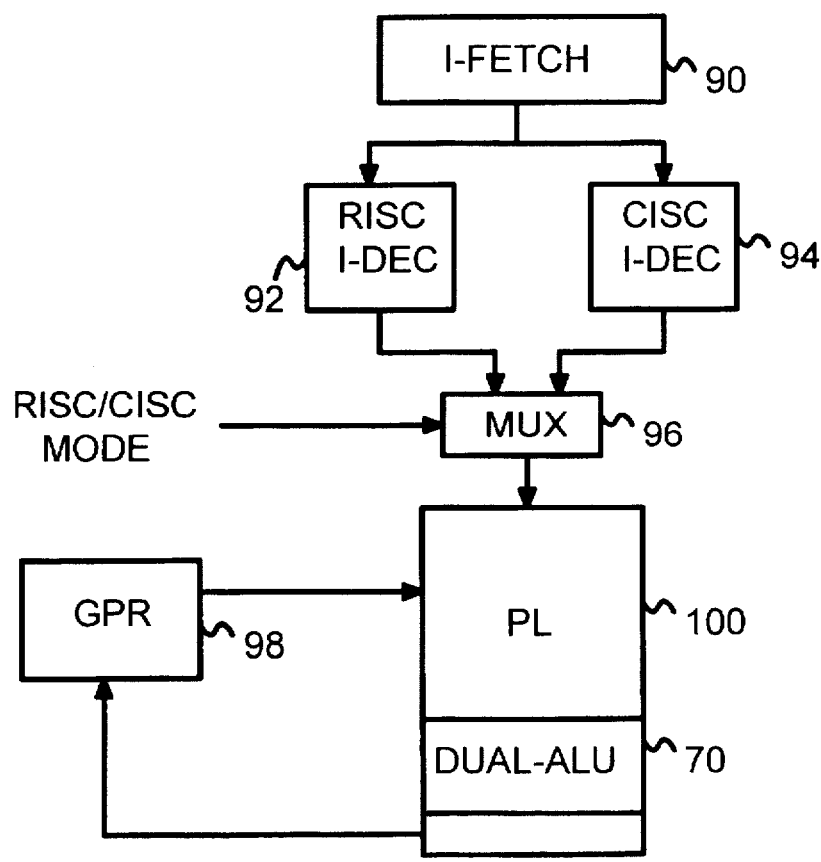
FIG. 14 is an architectural diagram of a dual-instruction-set CPU.

FIG. 14 is an architectural diagram of a dual-instruction-set CPU. Native CISC instructions are executed on an otherwise RISC processor. Instruction fetcher 90 fetches both RISC and CISC instructions from a cache or memory (not shown). Fetched instructions are sent to RISC decoder 92 and CISC decoder 94. RISC decoder 92 assumes the instructions received are RISC instructions and attempts to decode them. CISC decoder 94 assumes the instructions received are CISC instructions and also attempts to decode them. For any particular instruction, either the decoded RISC instruction or the decoded CISC instruction is incorrect. Decoded RISC and CISC instructions are sent to mux 96 which selects decoded RISC instructions from RISC decoder 92 when in RISC mode, but selects decoded CISC instructions from CISC decoder 94 when the CPU is in CISC mode.

Pipeline 100 receives decoded RISC or CISC instructions from mux 96 and processes these decoded instructions in a series of stages which fetch operands from GPR's 98 and/or external cache or memory, and write results and flags back to GPR's 98. Pipeline 100 includes as one stage dual-ALU 70, which executes add, multiply, Boolean, and rotate/merge instructions as described previously.

U.S. Pat. No. 5,481,684 and its parent application describe such a dual-instruction-set CPU, and using segment descriptors to determine when to switch between RISC and CISC modes. Other details of a dual-instruction-set CPU are contained in U.S. Pat. No. 5,481,693 which describes a shared register architecture wherein the GPR's and flags are directly shared among RISC and CISC programs without register swapping or saving to memory.

The present application describes the heart of the dual-instruction-set CPU—a dual-ALU capable of executing native RISC and native CISC instructions. Rather than duplicate the ALU or the processor's pipelines, a single ALU and a single pipeline are used to process both RISC and CISC instructions without software emulation or translation of CISC instructions into RISC instructions. The vectored mux provides a versatile piece of hardware that is so surprisingly versatile that both RISC and CISC instructions may be executed.

ADVANTAGES

The invention provides a versatile yet simple apparatus for executing a wide variety of operations: Boolean logic, merge, mask, rotate, shifts, sign-extension, and zero-extension and combinations thereof. Often separate units are provided for each of these operations. The invention provides a single unit for performing all of these operations.

The vectored mux can execute any arbitrary Boolean logic function merely by placing a different set of truth-table vectors to the data inputs. Thus special logic is not needed for each type of Boolean operation. Many types of Boolean operations can be supported with minimal design effort.

The same vectored mux is used for merge and mask operations. Using the same hardware for two purposes is an efficient use of limited silicon resources. The rotator is coupled to the vectored mux so that shifts and rotates can be sent through the vectored mux too. This allows compound operations such as rotate-merge operations to be performed in a single step.

Compound operations can be performed in a single step, such as a single clock cycle. Rotates and shifts can occur before a merge, mask, sign or zero-extension operation. Sign-extension can be combined with a Boolean operation by altering the truth-table vectors.

More complex CISC instructions require two or more steps or cycles in the ALU. Since RISC integer-divide and multiply instructions also require multiple steps, the multi-cycle control logic is already present in the RISC ALU. The temporary registers used to store the multiplier and partial quotients may also be used as temporary registers for intermediate results from multi-step CISC instructions. Thus the same hardware is used for a second purpose with the surprising result that both RISC and CISC instructions may be natively executed on the same ALU hardware.

The invention provides a very streamlined and efficient execution unit for the many miscellaneous instructions that must be processed, especially complex CISC instructions. When combined with an adder and a multiplier and divider, two complete sets of integer ALU instructions can be executed from a RISC and a CISC instruction set such as the x86 CISC and PowerPC™ RISC instruction sets.

ALTERNATE EMBODIMENTS

Several other embodiments are contemplated by the inventors. For example the invention has been described for 32-bit operations as the full width, but smaller or larger widths may be used, such as with advanced 64-bit processors. More complex or simple mask schemes may be used for the mask and merge operations by altering the mask generator. The vectored mux may be modified to have more or fewer data or control inputs, and the order of the inputs may also be modified. Multiple pipelines may be used for superscalar operation. Instruction sets other than RISC and CISC may be used, and indeed new terms describing architectures are being coined frequently.

While the more complex operations such as compound rotate-merge and shift-double operations have been described to show the features and capabilities of the vectored mux, many simpler instructions can also be executed by the apparatus. A more complex rotator can have additional features to insert the sign bit or zero bits to perform arithmetic and logical shifts rather than use the mask/merge features of the invention. A simple shifter rather than a simple rotator may also be substituted.

Many variations of the control logic are possible. The various muxes may be combined. For example, Muxes 50 and 12 may be combined into one larger mux. Muxes may also be combined with other hardware such as the mask generator being combined with mux 42. Generation of shift count SC and mask endpoints MB, ME may be generated in many different ways from the instruction itself or registers.

A shift overflow can be defined when the shift count SC is greater than or equal to 32. All the data is shifted out in a shift overflow. The mask is forced to all zeros and none of the rotated data is output as the result when a shift overflow occurs.

The particular assignment of polarities and inputs to muxes described herein is arbitrary. For example, inverting select inputs to the vectored mux and reversing bits in the truth-table produce the same result. Other RISC and CISC instructions besides those described herein may be executed as a sequence of shift/merge steps.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A logic-instruction execution unit for executing Boolean operations and merge operations, the logic-instruction execution unit comprising:

a vectored mux for outputting a result of a Boolean operation or a merge operation, the vectored mux comprising a plurality of individual mux cells, each mux cell having data inputs and select control inputs and an output driving one bit-position of the result, the select control inputs controlling which data input is coupled to drive the output independently of other data inputs;

a first operand input comprising a plurality of electrical signals representing a first operand;

a second operand input comprising a plurality of electrical signals representing a second operand;

operand-spread means, receiving the first operand input, for extending the first operand from a reduced-width operand to a full-width operand by duplicating the reduced-width operand to fill bit-positions in a full-width operand beyond the reduced-width operand, the operand-spread means outputting a spread first operand to a first data input of the vectored mux when the first operand is a reduced-width operand;

Boolean control means for applying the first operand input and the second operand input to the select control inputs of the vectored mux when a Boolean operation is executed;

truth-table inputs comprising electrical signals representing at truth table for the Boolean operation, the truth-table inputs varying for different Boolean operations;

the Boolean control means including means for applying the truth-table inputs to the data inputs of the vectored mux when a Boolean operation is executed;

merge control means for applying the spread first operand to the first data input on the vectored mux and for applying the second operand input to a second data input on the vectored mux when a merge operation is executed;

a mask generator for generating a mask indicating a first portion of the result from the first operand and a second portion of the result from the second operand, the first portion and the second portion not overlapping;

the merge control means including means for applying the mask to a select control input of the vectored mux when a merge operation is executed, wherein the mask causes the vectored mux to select the first portion of the first operand applied to the first data input and the second portion of the second operand applied to the second data input, whereby the vectored mux executes both merge operations and Boolean operations, the operands applied to the data inputs for merge operations but applied to the select control inputs for Boolean operations.

2. The logic-instruction execution unit of claim 1 wherein the reduced-width operand is a byte operand.

3. The logic-instruction execution unit of claim 1 wherein the operand-spread means is disabled for RISC instructions but enabled for CISC instructions using reduced-width operands.

4. The logic-instruction execution unit of claim 1 wherein the vectored mux is comprised of individual four-to-one mux cells each having four data inputs and two select control inputs;

the merge control means further comprising:

constant means for applying a constant electrical signal to one of the select control inputs when a mask or a merge operation is executed, the constant electrical signal preventing two of the four data inputs from being selected while allowing only the first and the second data inputs to be selected for mask and merge operations, whereby the vectored mux uses four data inputs for Boolean operations of two operands but only two data inputs for mask and merge operations.

5. The logic-instruction execution unit of claim 4 further comprising:

rotate means, receiving the spread first operand, for rotating the spread first operand by a shift-count number of bit-positions and outputting a rotated first operand to the first data input of the vectored mux when a rotate operation is executed;

the merge control means applying the mask having a constant value when a simple rotate operation is executed, the constant value causing the rotated first operand to be selected to drive the output of the vectored mux as the result, whereby rotate operations are also performed by the logic-instruction execution unit and rotate results are passed through the vectored mux.

6. The logic-instruction execution unit of claim 5 further comprising:

a carry flag indicating a carry from execution of a previous instruction;

the merge control means including carry means for applying the carry flag to the second data input on the vectored mux when a rotate-through-carry instruction is executed, the merge control means also applying the rotated first operand to the first data input on the vectored mux, whereby the carry flag is merged in by the vectored mux.

7. The logic-instruction execution unit of claim 6 further comprising:

carry flag means, coupled to the rotate means, for generating as the carry flag the least-significant bit of the rotated first operand;

the carry means including means for applying a complement of the carry flag to the second data input on the vectored mux when a bit-test-and-complement instruction is executed, the merge control means also applying the first operand to the first data input on the vectored mux, whereby the bit-test-and-complement instruction is executed by the vectored mux by merging the first operand with the complement of the carry flag.

8. The logic-instruction execution unit of claim 7 wherein the complement of the carry flag is applied to the second data input on the vectored mux during a subsequent cycle when a bit-test-and-complement instruction is executed, the rotate means rotating the spread first operand during an initial cycle before the subsequent cycle and outputting the least-significant bit of the rotated first operand to the carry flag means for generating the carry flag before the subsequent cycle, whereby the bit-test-and-complement instruction is executed in more than one cycle.

9. The logic-instruction execution unit of claim 7 for further executing a compound shift-merge instruction in a single step and a rotate-merge instruction in a single step, the merge control means applying the rotated first operand to the first data input and applying the mask to the select control input when the compound shift-merge instruction is executed.

10. The logic-instruction execution unit of claim 9 wherein the compound shift-merge instruction and rotate-merge instruction executed in a single step are each native RISC instructions and wherein the bit-test-and-complement instruction executed in more than one cycle is a native CISC instruction, whereby the vectored mux in the logic-instruction execution unit executes native RISC instructions and native CISC instructions.

11. The logic-instruction execution unit of claim 10 wherein the compound shift-merge instruction is a RISC rotate-left word immediate then mask-insert rlwimi instruction and wherein the bit-test-and-complement instruction is a CISC bit-test instruction.

12. A central processing unit (CPU) having an arithmetic-logic-unit (ALU) for executing integer instructions from a first instruction set and from a second instruction set, wherein the ALU comprises:

a first operand input;

a second operand input;

a byte-spreader for copying a byte-operand to a full width of the ALU;

a result output;

an adder for performing add and subtract operations on the first and second operand inputs, the adder outputting a sum as the result output;

a Boolean-logic unit for performing Boolean, merge, rotate, and shift operations, the Boolean-logic unit comprising:

a vectored mux having a plurality of multiplexer cells each having data inputs, a first select input and a second select input, and output for outputting one bit-position of the result output, each multiplexer cell selecting one of the data inputs as the result output in response to the first and second select inputs;

truth-table means for applying electrical signals representing a truth-table of a Boolean-logic function being executed to the data inputs of the vectored mux;

first select means for applying the second operand input to the first select inputs of the vectored mux when a Boolean operation is being executed, but applying a constant signal to the first select inputs when a Boolean operation is not being executed;

mask generator means for generating a mask indicating which bit-positions of the first operand input are output to the result output and which bit-positions of the first operand input are not output to the result output;

second select means for applying the first operand input to the second select inputs of the vectored mux when a Boolean operation is being executed, but applying the mask to the second select inputs when a Boolean operation is not being executed;

a shifter for shifting and rotating the first operand input to produce a shifted first operand when a rotate or shift operation is being executed;

first data select means, coupled to the shifter and the truth-table means, for outputting one of the truth-table signals to a data input of the vectored mux when a Boolean operation is being executed but for outputting the shifted first operand to a data input of the vectored mux when a Boolean operation is not being executed;

second data select means, coupled to the second operand input and the truth-table means, for outputting a second one of the truth-table signals to a second data input of the vectored mux when a Boolean operation is being executed but for outputting the second operand input to the second data input of the vectored mux when a Boolean operation is not being executed;

whereby the Boolean-logic unit executes Boolean-logic operations and merge, rotate, and shift operations.

13. The CPU of claim 12 wherein the Boolean, merge, rotate, and shift operations from the first instruction set are performed in a single clock cycle.

14. The CPU of claim 12 further comprising:

a first instruction decoder for decoding instructions from the first instruction set, the first instruction decoder generating decoded first instructions;

a second instruction decoder for decoding instructions from the second instruction set, the second instruction decoder generating decoded second instructions;

wherein the first instruction set has an encoding of instructions to operations which is independent of the encoding of instructions to operations for the second instruction set;

an instruction mux, for selecting decoded first instructions from the first instruction decoder when the CPU is executing instructions from the first instruction set but selecting decoded second instructions from the second instruction decoder when the CPU is executing instructions from the second instruction set;

a pipeline containing the ALU, the pipeline receiving the decoded instructions selected by the instruction mux;

wherein the ALU executes decoded first instructions from the first instruction set and decoded second instructions from the second instruction set.

15. The CPU of claim 14 wherein the instructions from the first instruction set are performed in a single clock cycle but compound instructions from the second instruction set are performed in two clock cycles, wherein the compound instructions from the second instruction set include a shift-double instruction and a rotate-through-carry instruction.

16. The CPU of claim 15 wherein the first instruction set is a RISC instruction set and wherein the second instruction set is a CISC instruction set.

* * * * *